3,244,740
ARYL SULFONYLMETHYL ISOTHIOCYANATES
George E. Lukes, Irvington, N.Y., and Ashley H. Freiberg, Santa Clara, Calif., assignors to Stauffer Chemical Company, New York, N.Y., a corporation of Delaware
No Drawing. Filed Sept. 27, 1961, Ser. No. 141,007
3 Claims. (Cl. 260—454)

This invention relates to organic isothiocyanates and, in particular, to arylsulfonylmethyl isothiocyanates such as phenylsulfonylmethyl isothiocyanates and to a method of preparing them. The invention also pertains to microbiocidal compositions having, as the active component thereof, at least one of the aforesaid arylsulfonylmethyl isothiocyanates and to methods of preparing, using and applying such compositions.

The art is generally aware that organic isothiocyanates are valuable materials which have marked usefulness in the chemical and biological fields. For instance, methyl isothiocyanate has been employed for some time in controlling or combating various microorganisms such as fungi, bacteria and the like. A recent British Patent 825,693 reports that benzyl isothiocyanates are likewise biologically active.

In considering the organic isothiocyanates of the prior art, of which the above described members are typical, it will be observed that they constitute a relatively simple configuration, i.e. the isothiocyanate function is attached directly to a hydrocarbon residue. We have now discovered a new and different type of organic isothiocyanate having a dual structure characterized by the presence of both an isothiocyanate and a sulfonyl function. These patently new entities are exceedingly biologically active and are useful in providing the art with new and novel biocidal agents.

It is, therefore, a primary object of this invention to provide the aforesaid dual function isothiocyanates including a method of preparing them. A further object of the invention is to provide for methods of using and applying such biocidal components. Other objects and purposes will become manifest as the description proceeds.

The organic isothiocyanates of the type contemplated herein can be generally represented by the following formula:

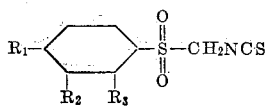

wherein $R_1$, $R_2$ and $R_3$, which may be alike or different, signify hydrogen, nitro, lower alkoxyl, e.g. methoxy, ethoxy, n-propoxy, isopropoxy, n-butoxy, etc.; halogen e.g. chlorine, bromine, fluorine, etc., and a lower hydrocarbon radical such as a lower alkyl group e.g. methyl, ethyl, n-propyl, isobutyl or the like, a lower unsaturated aliphatic group e.g. vinyl, allyl, isopropenyl, propargyl or the like, a monocyclic alkyl group e.g. cyclopentyl, cyclohexyl, cycloheptyl or the like and a lower aromatic hydrocarbon radical of the benzene and naphthalene series that is a phenyl or naphthyl radical.

Compounds which are illustrative of the above depicted general formula include the following configurations:

Compound 1

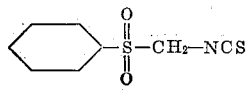

Compound 2

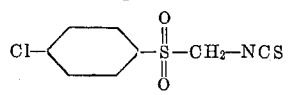

Compound 3

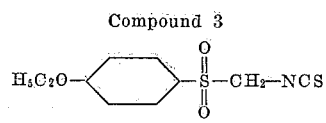

Compound 4

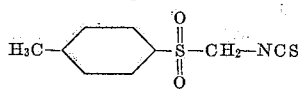

Compound 5

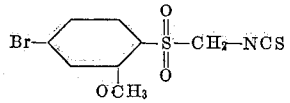

Compound 6

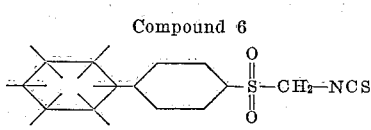

Compound 7

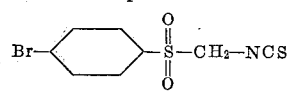

Compound 8

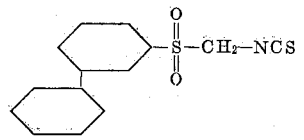

Compound 9

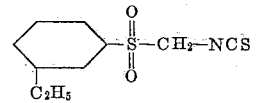

Compound 10

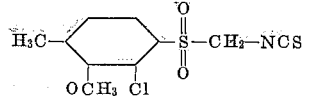

Compound 11

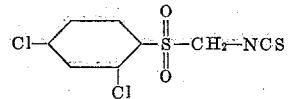

Compound 12

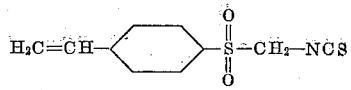

The compounds of this invention are susceptible to a general mode of preparation which involves oxidizing an aryl mercapto methyl isothiocyanate having the following formula:

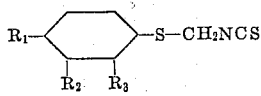

wherein $R_1$, $R_2$ and $R_3$ have the values previously defined. It has been ascertained that the reaction can be conveniently carried out by effecting oxidation of the sulfide grouping using hydrogen peroxide as the oxidizing agent while maintaining a reaction temperature of about 0° C. Although not absolutely necessary, the use of a solvent facilitates the oxidative reaction and, for this purpose, we have found acetic acid to be suitable. The product can be readily isolated by distilling off the solvent under reduced pressure followed by purification of the residual arylsulfonylmethyl isothiocyanate a step which is conveniently carried out by crystallization from suitable organic solvents. However, if desired, the crude product can be used as such for preparing biocidal compositions.

The arylmercaptomethyl isothiocyanates which are employed as intermediates in the above described reaction are known compounds and their preparation and description can be found in various technical publications throughout the prior art. Suffice it to say that such starting components are usually synthesized by the chloromethylation of a thiophenol, the reaction conditions being so adjusted that chloromethylation takes place at the sulfur atom of the thiophenol. The resulting S-chloromethylated product is next reacted with a metal thiocyanate such as an alkali metal thiocyanate whereby there is obtained an arylmercaptomethyl thiocyanate. The latter component is then isomerized to the isothiocyanate structure by any number of well known procedures although heating is a method commonly employed to achieve this. Since arylthiophenols and numerous substituted derivatives thereof are well known chemical compounds and their chloromethylation can be easily carried out, the arylsulfonylmethyl isothiocyanates of this invention are obtainable whenever the aforesaid thiophenols can be procured.

Reference is now made to the following examples which are inserted for the purpose of illustrating the various compounds and methods described herein various ramifications and modifications of which will be apparent to those skilled in the art without departing from the spirit and scope of the invention.

*Example 1.—p-Chlorophenylsulfonylmethyl isothiocyanate*

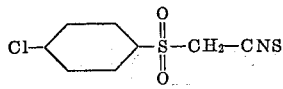

21.7 g. (0.1 mole) of p-chlorophenylmercaptomethyl isothiocyanate was dissolved in 300 ml. of glacial acetic acid and to this solution was added 22.7 g. of 30% hydrogen peroxide during which time the temperature was maintained at 0° C. After standing for 20 hours, the reaction mixture was heated gradually to 95° C. over a period of 3 hours, after which the acetic acid was removed by distillation at a pressure of 14 mm. The residue of white crystals were collected on a filter and air dried. The melting point of the product was 129–130° C. and amounted to 15.5 g. corresponding to 63% of the theoretical yield.

*Example 2.—p-Bromophenylsulfonylmethyl isothiocyanate*

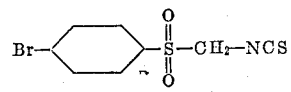

Using the procedure as given in Example 1, p-bromophenylmercaptomethyl isothiocyanate was subjected to oxidation with 30% hydrogen peroxide in glacial acetic acid. The results and yield paralleled those of the first example.

*Example 3.—p-Ethoxyphenylsulfonylmethyl isothiocyanate*

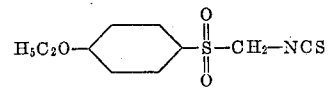

0.01 mole of p-ethoxyphenylmercaptomethyl isothiocyanate was dissolved in glacial acetic acid and subjected to the oxidative treatment in accordance with the procedure of Example 1. The results and yield corresponded to those obtained in the case of the earlier examples.

As previously pointed out, the isothiocyanates of this invention exhibit unusually high activity against microorganisms, being especially useful in combating or otherwise controlling bacteria and fungi. For example, compound 1 when employed at a concentration of 10 p.p.m. was effective in controlling *Staphylococcus aureus*. At a concentration of 25 p.p.m., it was effective against *Erwinia amylovera* and *Escherichia coli*.

Experiments were also conducted for the control of other microorganisms. In vitro tests were carried out to measure the fungitoxicity of the herein contemplated toxicants when placed in contact with growing fungus or bacteria. In this procedure 1 oz. bottles are partially filled with 10 ml. of malt or nutrient broth and capped with aluminum foil, sterilized and maintained for the test. A compound is then injected by means of a syringe through the foil and into the broth followed by inoculation with a water suspension of spores. The bottles are then sealed and held for one week before the results are evaluated.

A foliage fungicide test is conducted in order to ascertain the protectant action as well as eradicant and leaf systemic action of the test compounds. The particular type of action which is produced by the test compound is determined by evaluation tests. Pinto bean plants are sprayed with various concentrations of the toxicant and, after drying, the plants are inoculated with bean rust or powdery mildew spores. Rust infection requires an overnight treatment in a moisture chamber following inoculation.

A soil fungicide incorporation test serves to indicate fumigant and non-fumigant activity against soil fungi. Three typical plant pathogens are selected and mixed with sterilized soil which is then placed in 1 lb. portions in quart jars. A small depression is formed in the soil and filled with coarse sand. 1 ml. of a 5% acetone solution of the compound is placed on the sand filled depression, after which the jar is sealed. The container is then vigorously shaken in order to thoroughly mix the compound throughout the soil. The soil treated in this manner is seeded with cotton or pinto beans and sealed with water. After a suitable germination period, the infected plants are examined and the results recorded and evaluated.

In conducting the bactericidal tests, the active component is incorporated in a nutrient such as a solution of agar. After hardening the agar is inoculated by streaking on the surface and the plates examined after an inoculation period of a few days. Typical results obtained from the above described tests are recorded in the table below.

TABLE

| Compound | In vitro tests | | | Foliage tests | | | | | Soil tests | | |
|---|---|---|---|---|---|---|---|---|---|---|---|
| | A.n. | P. | R. | P.p.m. | Rust | M'dew | Corn | Tomato | Rh. | Fus. | Py. |
| 2 | *5 | *(5) | (10) | 1,000<br>500<br>100 | 100<br>100<br>35 | 90<br>90<br>20 | 90<br>90<br>35 | 100<br>100<br>90 | *(110) | (5) | *(13) |
| 7 | *(5) | (10) | | 1,000<br>500<br>100 | 90<br>90<br>35 | 35<br>0<br>0 | | | 110 | *110 | |

*Lowest concentration in p.p.m. tested.
In vitro and soil tests: Figures in parentheses indicate fungus inhibition at that concentration in p.p.m. Complete control is indicated by figures with no parentheses.
Foliage tests: Figures represent percent disease control at 1,000, 500 and 100 p.p.m. Diseases were Pinto bean rust and Powdery mildew, Northern corn leaf blight and Tomato gray leaf spot.
A.n.=*Aspergillus niger.* P.=*Penicillium.* Rh.=*Rhizoctonia solani.* Fus.=*Fusarium solani.* R.=Rhizopus. Py.=*Pythium ultimum.*

It is to be understood that the compounds and compositions of this invention can be employed in several ways for the control of microorganisms and, in this connection the above described tests represent only one type of application of the compounds. They may also be utilized as preventive agents which produce a toxic barrier between the inoculum and the host tissues or, on the other hand, they may be employed in such a manner as to inhibit the production of inoculum. Those skilled in the art will be able to ascertain the particular mode of application which is most desirable in dealing with a particular situation.

The biocidal compositions of this invention can be formulated in numerous ways depending on the circumstances under which the compositions are used. For instance, liquid fungicidal compositions can be produced by dissolving the active component of the invention in an organic solvent followed by dispersion in water, preferably in the presence of a surface active agent. In some instances, it may be preferable to employ the compound in the form of a solid, in which case the toxicant is commonly blended with certain inert carriers which are selected for their ability to form a homogeneous powder suitable for applying to the plants as a dust. In preparing the aforesaid formulations, the active components are used in an amount sufficient to exert a fungicidal effect. Satisfactory results are produced when the toxicant constitutes approximately 1–50% of the total weight of the composition. In this connection, many factors must be considered, such as the particular compound constituting the active component as well as the nature of the carrier and the mode of application which is contemplated. These are factors to which those skilled in the fungicidal art are cognizant.

In compounding solid formulations of our compounds the active ingredient is diluted or otherwise extended with inert solids to form dust or powders. For this purpose, resort is had to such materials as diatomaceous earth, synthetic fine silica, calcium silicate, bentonite, talc and the like. Preferably, the solid carriers should be finely divided and it is desirable that the particle size be less than 20 microns.

In the event a liquid fungicidal composition is called for, then the active compound is advantageously dissolved in a suitable liquid solvent. The resulting solution can either be used as prepared or it may be conveniently diluted with water, thus forming a dispersion of the toxicant. If a water immiscible solvent is selected to effect dissolution of the toxicant, then dispersions prepared therefrom will consist of oily droplets of dissolved toxicant distributed throughout the aqueous medium. On the other hand, if a water miscible solution of the compound is used and diluted with water, then the resulting dispersions will consist of minute particles of the solid active component distributed throughout the aqueous continuous phase. Typical of water immiscible solvents for use as above described are kerosene, Stoddard solvent, aromatic hydrocarbons such as xylene, toluene and the like, higher alcohols, alkylated naphthalenes etc. Suitable water miscible solvents include the lower water soluble ketones as exemplified by acetone and methyl ethyl ketone, certain of the lower amides such as dimethyl formamide, diethyl formamide and the like, lower saturated aliphatic alcohols as typified by ethanol, isopropanol, various glycol ethers particularly Cellosolves such as methylcellosolve, ethylcellosolve and the like.

As previously mentioned, solvent solutions of the compounds are designed to be used as such. However, they are commonly extended with large quantities of water to form dispersions, preferably in the presence of a surface active agent including those of the anionic, cationic or nonionic types. Examples of these adjuncts are the sulfonated animal and vegetable oils, sulfonated petroleum oils, sodium lauryl sulfonate ethylene oxide condensation products of the type produced by reacting octyl phenol with ethylene oxide, higher alkyl pyridinium halides as exemplified by lauryl pyridinium bromide and cetylbenzyldimethylammonium chloride. In general, we have ascertained that excellent results ensue when the surface active agent constitutes about 1–15% by weight of the composition.

We claim:

1. A phenylsulfonylmethyl isothiocyanate of the following general formula:

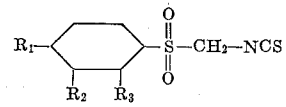

wherein $R_1$, $R_2$ and $R_3$ are each selected from the group consisting of hydrogen, nitro, lower alkoxyl, fluorine, bromine, chlorine, and a lower hydrocarbon radical.

2. p-Chlorophenylsulfonylmethyl isothiocyanate of the formula:

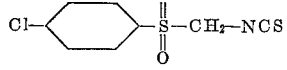

3. p-Bromophenylsulfonylmethyl isothiocyanate of the formula:

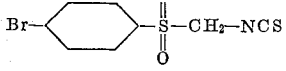

References Cited by the Examiner

UNITED STATES PATENTS

| | | | |
|---|---|---|---|
| 2,077,479 | 4/1937 | Hollander | 260—454 |
| 2,577,409 | 12/1951 | Emerson et al. | 260—454 |
| 2,785,190 | 3/1957 | Klopping | 260—454 |
| 2,802,769 | 8/1957 | Van Stryk et al. | 260—454 |
| 2,885,428 | 5/1959 | Luskin | 260—454 |
| 2,992,159 | 7/1961 | Kahn et al. | 167—30 |
| 2,992,966 | 7/1961 | Jacobi et al. | 167—30 |
| 3,006,965 | 10/1961 | Schrader | 260—454 |
| 3,095,437 | 6/1963 | Stephens et al. | 260—454 |

CHARLES B. PARKER, *Primary Examiner.*

STANLEY H. LIBERSTEIN, DALE R. MAHAN AND, *Assistant Examiners.*